United States Patent
Rane et al.

(10) Patent No.: US 12,353,994 B2
(45) Date of Patent: Jul. 8, 2025

(54) SYSTEM AND METHOD FOR REASONING ABOUT THE DIVERSITY AND ROBUSTNESS OF AN ENSEMBLE OF CLASSIFIERS

(71) Applicant: Palo Alto Research Center Incorporated, Palo Alto, CA (US)

(72) Inventors: Shantanu Rane, Menlo Park, CA (US); Alejandro E. Brito, Mountain View, CA (US); Hamed Soroush, San Jose, CA (US)

(73) Assignee: Xerox Corporation, Norwalk, CT (US)

( * ) Notice: Subject to any disclaimer, the term of this patent is extended or adjusted under 35 U.S.C. 154(b) by 1077 days.

(21) Appl. No.: 17/158,631

(22) Filed: Jan. 26, 2021

(65) Prior Publication Data
US 2022/0237443 A1    Jul. 28, 2022

(51) Int. Cl.
| | | |
|---|---|---|
| G06N 3/08 | (2023.01) | |
| G06F 18/214 | (2023.01) | |
| G06F 18/2415 | (2023.01) | |
| G06N 20/10 | (2019.01) | |
| G06N 20/20 | (2019.01) | |

(52) U.S. Cl.
CPC ............. *G06N 3/08* (2013.01); *G06F 18/214* (2023.01); *G06F 18/2415* (2023.01); *G06N 20/10* (2019.01); *G06N 20/20* (2019.01)

(58) Field of Classification Search
CPC .. G06F 18/213; G06F 18/214; G06F 18/2415; G06N 20/10; G06N 20/20; G06N 3/045; G06N 3/048; G06N 3/08; G06V 10/766; G06V 10/776; G06V 10/82
See application file for complete search history.

(56) References Cited

U.S. PATENT DOCUMENTS

2011/0302111 A1    12/2011    Chidlovskii

OTHER PUBLICATIONS

Chordia et al., "Plankton Image Classification", 2015, http://cs231n.stanford.edu/reports/2015/pdfs/sagarc14_final_report.pdf, pp. 1-5. (Year: 2015).*
Enes et al., "Version Space Reduction Based on Ensembles of Dissimilar Balanced Perceptrons", Jul. 2016, Proceedings of the Twenty-Fifth International Joint Conference on Artificial Intelligence (IJCAI-16), pp. 1448-1454. (Year: 2016).*
Kazemi et al., "Ensemble-based Adversarial Defense Using Diversified Distance Mapping", Sep. 28, 2020, ICLR 2021 Conference Blind Submission, pp. 1-24. (Year: 2020).*
Weng et al., "Evaluating the Robustness of Neural Networks: An Extreme Value Theory Approach", Jan. 31, 2018, arXiv:1801.10578v1, pp. 1-18. (Year: 2018).*

(Continued)

*Primary Examiner* — Brent Johnston Hoover (57) ABSTRACT

One embodiment provides a system which facilitates reasoning about classifiers. During operation, the system determines a plurality of neural networks. The system derives, from a respective neural network, a linear model, wherein the linear model is constructed based on an output of a penultimate layer of the respective neural network. The system trains the linear model based on activations of the penultimate layer. The system maps parameters of the trained linear model into a version space.

20 Claims, 9 Drawing Sheets

(56) References Cited

OTHER PUBLICATIONS

Tsoumakas, Grigorios, Ioannis Katakis, and Ioannis Vlahavas. "Effective and efficient multilabel classification in domains with large number of labels." Proc. ECML/PKDD 2008 Workshop on Mining Multidimensional Data (MMD'08). vol. 21. 2008. (Year: 2008).
Similarity-based Multi-label Learning taken from https://arxiv.org/pdf/1710.10335v1 .pdf (Year: 2017).
Ml-knn: A Lazy Learning Approach toMulti-Label Learning taken from http://citeseerx.ist.psu.edu/viewdoc/download?doi=10.1.1.89.7148&rep=rep1&type=pdf (Year: 2007).
Score Normalization and Aggregation for Active Learning in Multi-label Classification taken from https://www.researchgate.net/publication/222089355_Score_Normalization_and_Aggregation_for_Active_Learningjn_Multi-label_Classification (Year: 2010).
ML-CLUBAS: A Multi Label Bug Classification Algorithm taken from https://file.scirp.org/Html/2-9301529_26203.htm (Year: 2012).
A Fuzzy Similarity-Based Approach for Multi-label Document Classification taken from https://www.researchgate.net/publication/232625068_A_Fuzzy_Similarity-Based_Approach_for_Multi-labeLDocument_Classification (Year: 2009).
Madhieh Abbasi et al. "Robustness to Adversarial Examples Through and Ensemble of Specialists" Computer Vision and Systems Laboratory, Electrical and Computer Engineering Department Universite Laval, Quebec, Canada, Mar. 10, 2017.
Naveed Akhtar et al. "Threat of Adversarial Attacks on Deep Learning in Computer Vision: A Survey", School of Computer Science and Software Engineering, University of Western Australia, Feb. 26, 2018.
Maria-Florina Balcan et al. "Agnostic Active Learning", Jun. 13, 2008.
Alexander Bagnall et al. "Training Ensembles to Detect Adversarial Examples", Dec. 11, 2017.
Battista Biggio et al. "Wild Patterns: Ten Years After the Rise of Adversarial Machine Learning", Jul. 19, 2018.
Anirban Chakraborty et al. "Adversarial Attacks and Defences: A Survey", Sep. 28, 2018.
Nicholas Carlini et al. "Towards Evaluating the Robustness of Neural Networks", Mar. 22, 2017.
Yoav Freund et al. "Selective Sampling Using the Query by Committee Algorithm", Machine Learning, 28, 133-168 (1997), 1997 Kluwer Academic Publishers.
Ian J. Goodfellow et al. "Explaining and Harnessing Adversarial Examples", Mar. 20, 2015.
Steve Hanneke "Rates of Convergence in Active Learning", The Annals of Statistics, 2011, vol. 39, No. 1, 333-361, Institute of Mathematical Statistics, 2011.
Haym Hirsh "Theoretical Underpinnings of Version Spaces", Computer Science Department Rutgers University, New Brunswick, NJ.
Ralf Herbrich et al. "Bayes Point Machines", 2001.
Ikebana "Robust Arrangements of Classifiers in Version Space".
Qiang Liu "A Survey on Security Threats and Defensive Techniques of Machine Learning: A Data Driven View", IEEE Feb. 2018.
Yu Li "On the Decision Boundary of Deep Neural Networks", Jan. 1, 2019.
Tessa Lau "Programming by Demonstration Using Version Space Algebra", Machine Learning, 53, 111-156, 2003.
Tom M. Mitchell "Generalization as Search", Computer Science Department, Rutgers University.
Seyed-Mohsen Moosavi-Dezfooli "DeepFool: a simple and accurate method to fool deep neural networks" Jul. 4, 2016.
Aamir Mustafa "Adversarial Defense by Restricting the Hidden Space of Deep Neural Networks" Jul. 28, 2019.
Nicolas Papernot "Distillation as a Defense to Adversarial Perturbations against Deep Neural Networks" IEEE 2016, Mar. 14, 2016.
Shantanu Rane "A Version Space Perspective on Differentially Private Pool-Based Active Learning", Downloaded Aug. 28, 2020.
Daniel Soudry "The Implicit Bias of Gradient Descent on Separable Data", Journal of Machine Learning Research 19 (2018), Dec. 28, 2018.
Jiawei Su "One Pixel Attach for Fooling Deep Neural Networks" Oct. 17, 2019.
Yichuan Tang "Deep Learning using Linear Support Vector Machines", Feb. 21, 2015.
Simon Tong "Support Vector Machine Active Learning with Applications to Text Classification", Journal of Machine Learning Research (2001).
Florian Tramer "Ensemble Adversarial Training: Attacks and Defenses" ICLR 2018, Apr. 26, 2020.
Yan Zhou "Breaking Transferability of Adversarial Samples with Randomness", Jun. 17, 2018.

\* cited by examiner

SYSTEM AND METHOD FOR REASONING ABOUT THE DIVERSITY AND ROBUSTNESS OF AN ENSEMBLE OF CLASSIFIERS

FIELD

This disclosure is generally related to machine learning and data classification. More specifically, this disclosure is related to a system and method for evaluating the diversity and robustness of an ensemble of classifiers.

RELATED ART

In the field of machine learning, adversarial examples can exploit the way that artificial intelligence algorithms work in order to disrupt the behavior of the algorithms. Recently, an increasing number and types of attacks have been devised in order to fool the algorithms, along with increasingly stronger defenses against such attacks. One large class of these attacks is "perturbation-bounded evasion attacks," which involve adversarial examples constructed by perturbing data samples with the goal of forcing a classifier to misclassify them. Such evasion attacks comprise a predominant class of attacks considered in current machine learning technology. One specific type of evasion attack involves adversarial examples which can be trivially classified by a human but can fool a machine learning classifier.

One solution to address these evasion attacks is to use an ensemble or collection of classifiers. However, an understanding of the behavior of the ensemble as well as its robustness to attacks remains a challenge.

SUMMARY

One embodiment provides a system which facilitates reasoning about classifiers. During operation, the system determines a plurality of neural networks. The system derives, from a respective neural network, a linear model, wherein the linear model is constructed based on an output of a penultimate layer of the respective neural network. The system trains the linear model based on activations of the penultimate layer. The system maps parameters of the trained linear model into a version space.

In some embodiments, the neural networks are trained using a same training data set. The penultimate layer in each of the neural networks is a same size, and a final layer in each of the neural networks is a same size.

In some embodiments, the system derives, from each of the plurality of neural networks, a collection of linear models to obtain an ensemble of classifiers, wherein a version space comprises classifiers denoted by points in the version space and data samples denoted by hyperplanes bisecting the version space. The system measures a diversity metric of the ensemble of classifiers.

In some embodiments, the ensemble of classifiers comprises collections of linear models derived from each network in the plurality of neural networks. A collection of linear models are classifiers, where each classifier is represented by a point in the version space determined by the training data set upon which that classifier was trained.

In some embodiments, measuring the diversity of the ensemble of classifiers is based on one or more of: a geometric distance between a respective classifier and each other classifier in a respective version space; a distance between a respective classifier and a distribution of points which represent the classifiers in the respective version space. One example of a statistically motivated distance measure is a Mahalanobis distance.

In some embodiments, the classifiers are represented by weights, and measuring the diversity of the ensemble of classifiers is based on a statistical dispersion metric of the weights of the classifiers.

In some embodiments, the activations of the penultimate layer comprise an intermediate representation of data which is distinct from the data input to the respective neural network.

In some embodiments, the system measures a robustness of the ensemble of classifiers based on one or more of: a percentage of classifiers which are successfully attacked by an adversarial example; an accuracy of an ensemble decision rule based on a plurality of adversarial examples; and a counterfactual influence of one or more training samples on decision boundaries of the classifiers in the ensemble of classifiers.

In some embodiments, the system increases, based on the version space, a rate of accuracy in classification of a set of test data based on measuring results for perturbation-bounded evasion attacks or other adversarial examples.

In some embodiments, deriving the linear model from the respective neural network comprises converting the respective neural network to the linear model based on a one or more of: a support vector machine (SVM); a softmax classifier; and a hinge-loss classifier.

BRIEF DESCRIPTION OF THE FIGURES

In the figures, like reference numerals refer to the same figure elements.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

Introduction and Overview

The embodiments described herein solve the problem of addressing perturbation-bounded evasion attacks by providing a system which reasons about the diversity and robustness of an ensemble of classifiers.

As described above, adversarial machine learning examples can exploit the way that artificial intelligence algorithms work in order to disrupt the behavior of the algorithms. Recently, an increasing number and types of attacks have been devised in order to fool the algorithms, along with increasingly stronger defenses against such attacks. One large class of these attacks is "perturbation-bounded evasion attacks," which involve adversarial examples constructed by perturbing data samples with the goal of forcing a classifier to misclassify them. Such evasion attacks comprise a predominant class of attacks considered in current machine learning technology. One specific type of evasion attack involves adversarial examples which can be trivially classified by a human but can fool a machine learning classifier.

One solution to address these evasion attacks is to use an ensemble or collection of classifiers. However, an understanding of the behavior of the ensemble as well as its robustness to attacks remains a challenge.

The embodiments described herein provide a system which addresses this challenge by: using version space theory to analyze ensembles of classifiers; quantifying the relationship between diversity and robustness metrics based on the placement of classifiers in the version space; and providing an approach to use version space theory to reason about the robustness of ensembles to adversarial perturbations.

Given a plurality of classification neural networks, for each respective neural network, the system can convert the respective neural network to an equivalent classification linear model. After processing training data (such as an input image), the respective neural network of N layers can reach the penultimate layer (e.g., the $N-1^{th}$ layer). The output of this penultimate layer (or the activations of the penultimate layer) can be considered as an intermediate representation of data which is distinct and different from the original training data. In the final Nth layer, instead of using a softmax classifier for the M classes, the system uses a "maximum margin" classifier. This is achieved by replacing the cross-entry loss function for the Nth layer by a hinge-loss function, and training the model (i.e., the neural network) with that loss. This ensures that the activations of the penultimate layer, i.e., the intermediate layer outputs, are learned in a maximum margin context, and can be used more naturally to train a one-versus-all M-class SVM (linear) model. This is referred to as "M-SVM." The M-SVM can be used more effectively to analyze the robustness and diversity of classifiers in version space, compared to the original model. The system can then map the parameters of the M-SVM linear model into a version space, where the mapped parameters are based on the intermediate representation of the data input into the respective neural network.

The original training data size is not the same as the intermediate representation size. For example, the original training data may be associated with millions of parameters, while the intermediate representation of the data may only be associated with a much smaller number of parameters. Based on this intermediate representation which is output from the penultimate layer, the system can obtain data which has been converted to a much smaller number of parameters (e.g., a six-class classifier as described below in relation to FIG. 3), where each classifier is represented by its learned weights. The system can thus measure or quantify the diversity of the classifiers based on a statistical dispersion metric of the classifier weights. The system can also quantify diversity based on factors which can result in classifiers with different weights, e.g., diversity across predictions, optimizers, and hyperparameters.

The system can train the plurality of neural networks on the same data set, and in some embodiments, the size of the neural networks is the same. The size of the $N-1^{th}$ layer in each of the plurality of neural networks is the same, and the size of the $N^{th}$ layer in each of the plurality of neural networks is also the same.

Using the above approach, each neural network can thus produce M specific one-versus-all linear models or classifiers, where each linear model corresponding to an individual neural network is mapped into its own version space. A particular version space can include classifiers (or linear models) from each respective neural network. Thus, the term "linear model" can refer to the M-SVM classifier, which consists of M specific one-versus-all linear models or classifiers. The term "proxy model" or "proxy classifier" can refer to the model obtained by replacing the cross-entropy loss function in the classification layer, i.e., the Nth layer, by the hinge-loss function. The term "ensemble of classifiers" can refer to the overall collection of M-SVM classifiers (where each single M-SVM classifier itself is comprised of or includes a plurality of linear models). The term "point cloud" can refer to a collection of points in a version space, where each point represents a classifier from an ensemble of classifiers.

An exemplary three-class convolutional neural network (CNN) (e.g., where M=3) is described below in relation to FIG. 5. An exemplary diagram of version spaces for a six-class problem (e.g., where M=6) in two dimensions is described below in relation to FIG. 3. Exemplary version spaces with classifiers, boundaries, and adversarial examples are described below in relation to FIGS. 2B and 4.

In summary, the system can determine a plurality of neural networks, and can derive, from each respective neural network, a linear model (which can include a plurality of linear models, as described above). The derived linear model can be constructed based on an output or outputs of a penultimate layer of the respective neural network. The system can train the linear model based on activations of the penultimate layer, and can subsequently map parameters of the trained linear model into a version space. The system can also derive, from each of the plurality of neural networks, a collection of linear models each belonging to a version space, to obtain an ensemble of classifiers. The ensemble of classifiers can be indicated across multiple version spaces, as described below in relation to FIG. 3. The system can analyze the diversity and robustness the ensemble of classifiers, and can also provide a user interface to update information related to the ensemble, as described below in relation to FIG. 1.

Thus, by converting neural networks to equivalent linear models, and mapping parameters of the linear models into version spaces, the embodiments described herein provide a system and method for evaluating or reasoning about the diversity and robustness of an ensemble of classifiers.

Why Improving Robustness to Adversarial Examples is Important

Adversarial machine learning can include neural networks which process visual data. Current work relating to such adversarial machine learning has produced results which range from benign (e.g., misclassifying a turtle as a rifle or a panda as a gibbon) to potentially harmful or life-threatening (e.g., a self-driving car misclassifying a stop sign as a speed limit sign). In addition to visual data, adversarial machine learning can also apply to other data, such as text and audio data. These text and audio-related adversarial examples have produced results which also range from benign (e.g., improperly filtering spam emails) to privacy-invading (e.g., improperly sending a voice command to a smart speaker home device by playing a slightly modified streaming song from a music service).

Why Diversity Across Classifiers can Improve Robustness to Adversarial Examples

The embodiments described herein provide a system which extends version space theory to analyze ensembles (e.g., collections or groups) of classifiers. A version space is the set of all possible hypotheses (classifiers) that separate labeled data into a feature space. In the version space, points in the input space (i.e., data) can be represented as hyperplanes, and the classifiers can be represented as points. In contrast, in an input space, data is represented as points, and classifiers are indicated as boundaries. An exemplary input space and version space are described below in relation to FIGS. 2A and 2B. A version space is thus the set of all hypotheses (classifiers) that are consistent with the training data, i.e., classifiers which correctly classify the training data.

Version spaces have been used as a solution for concept learning, a binary classification problem. Version spaces have also been used to handle arbitrary programs and multi-class problems, as well as in the field of machine learning for foundational analysis of active learning, e.g., to derive provable bounds for label complexity. One feature of version spaces is providing a formal understanding of the optimality of classifiers. Some current approaches can identify approximately optimal classifiers in version space, and can also provide privacy-aware anomaly detection in online and pool-based settings. However, version spaces have not previously been used for analyzing and reasoning about the diversity and robustness of an ensemble of classifiers under adversarial perturbation.

Figure 1:
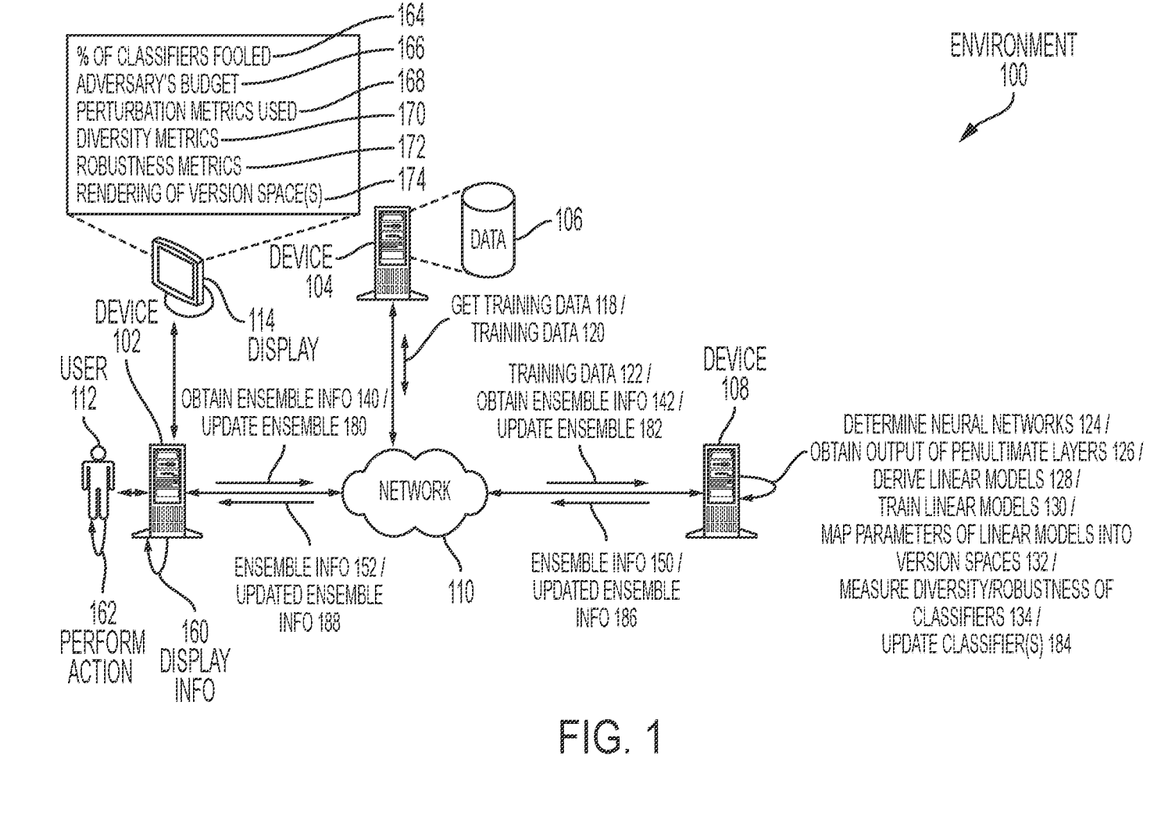
FIG. 1 presents an exemplary environment which facilitates reasoning about classifiers, in accordance with an embodiment of the present application.

Exemplary Environment which Facilitates Reasoning about an Ensemble of Classifiers FIG. 1 presents an exemplary environment 100 which facilitates reasoning about classifiers, in accordance with an embodiment of the present application. Environment 100 can include: a device 102, an associated user 112, and an associated display screen 114; a device 104 and an associated or included storage device 106; and a device 108. Devices 102, 104, and 108 can communicate with each other via a network 110. Device 102 can be a client computing device, e.g., a laptop computer, a mobile telephone, a smartphone, a tablet, a desktop computer, and a handheld device. Devices 102, 104, and 108 can be a computing device, e.g., a server, a networked entity, and a communication device.

During operation, device 108 can request and receive from device 104 training data (not shown), and device 104 can send training data to device 108 (via a get training data 118 communication and training data 120). Device 108 can receive training data 120 (as training data 122), and perform a series of operations to train models and create versions spaces. Device 108 can determine a plurality of neural networks (operation 124). Device 108 can obtain the output of the penultimate layers of the neural networks (operation 126). Device 108 can derive linear models based on activations of the penultimate layer (operation 128) and can also train the linear models (operation 130). Device 108 can map parameters of the linear models into version spaces (operation 132). Based on the mapped parameters in the version spaces, device 108 can measure the diversity and/or robustness of an ensemble of classifiers, which are created from the trained linear models and can be indicated as points in the version spaces (operation 134).

Device 108 can generate ensemble information, such as information relating to one or more of: diversity metrics; robustness metrics; information related to adversarial examples; and information needed to graphically render (e.g., on a user interface or other display screen) one or more of the created version spaces. Device 108 can send ensemble information 150 to device 102. Device 102 can receive ensemble information 150 (as ensemble information 152), and can perform a display information 160 operation, which can cause to be displayed on display 114 at least: information related to adversarial examples (e.g., a percentage ("%") of classifiers fooled 164, an adversary's budget 166, and perturbation metrics used 168); diversity metrics 170; robustness metrics 172; and a rendering of the version space(s) 174.

Figure 6A:
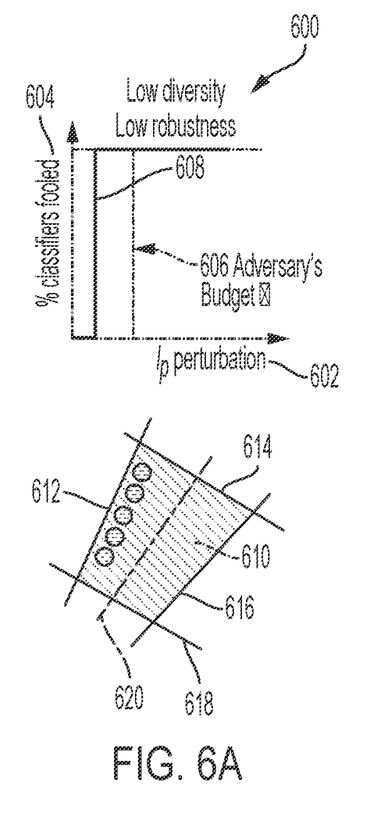
FIG. 6A illustrates a diagram of exemplary reasoning about robustness as a function of ensemble diversity for various perturbations metrics and published attacks, in accordance with an embodiment of the present application.

User 112 can view the information displayed on display 114, and can perform an action 162, e.g., to change a configuration or setting in the rendering of the version space, or to view detailed information about a specific adversarial example (such as described below in relation to FIGS. 6A-6C). User 112 can also select to view the rendering of the version spaces in two or three dimensions, and can perform other user actions to obtain more information regarding a particular version space, classifiers, or hyperplane/boundary. In some embodiments, user 112 can select a certain set of classifiers of the displayed or presented ensemble of classifiers, and can also generate (via a user interface widget, not shown) and send an update ensemble command 180 to device 108. Device 108 can receive update ensemble command 180 (as an update ensemble command 182), and can perform an update classifier(s) 184 operation, which can include measuring the diversity/robustness of the updated classifiers as well as returning updated ensemble information 186 to device 102. Device 102 can receive updated ensemble information 186 (as updated ensemble information 188), and can perform display information 160, which can cause updated information to be displayed on display 114, as described above.

Input Space vs. Version Space

Figure 2A:
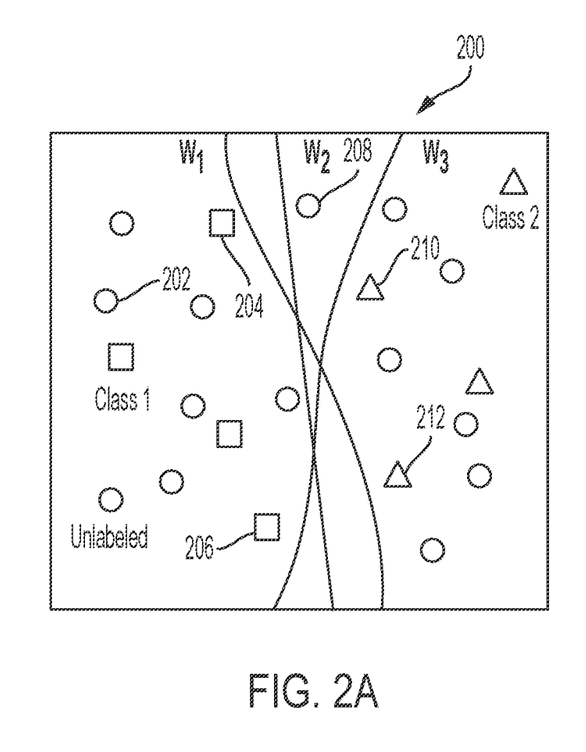
FIG. 2A illustrates a diagram of an exemplary input space, in accordance with an embodiment of the present application.

FIG. 2A illustrates a diagram 200 of an exemplary input space, in accordance with an embodiment of the present application. Diagram 200 can represent an input space associated with a set of data. In diagram 200, a plurality of labeled samples of "Class 1" is indicated as filled in squares (e.g., labeled samples 204 and 206), while a plurality of labeled samples of "Class 2" is indicated as filled in triangles (e.g., labeled samples 210 and 212). A plurality of unlabeled samples is indicated as open green circles (e.g., an unlabeled sample 208). Three classifiers appear as curved lines which intersect the input space. The three classifiers are indicated as $w_1$, $w_2$, and $w_3$.

Figure 2B:
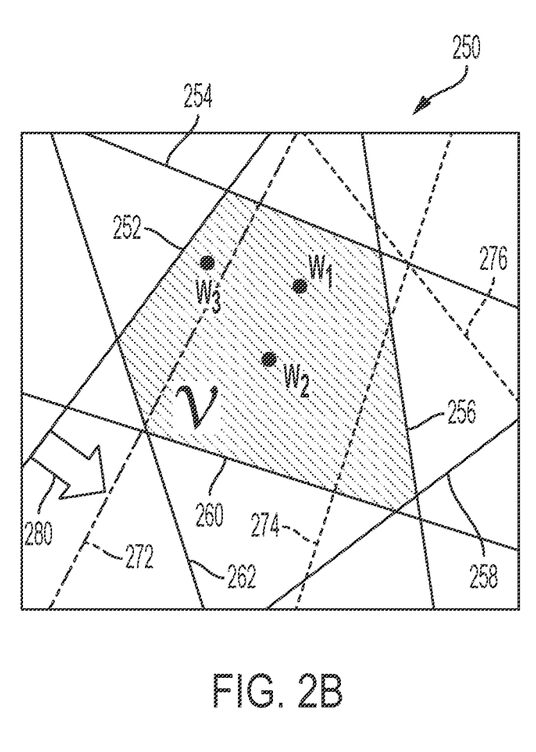
FIG. 2B illustrates a diagram of an exemplary version space, in which classifiers appear as points while data samples appear as lines (hyperplanes), in accordance with an embodiment of the present application.

FIG. 2B illustrates a diagram 250 of an exemplary version space, in which classifiers appear as points while data samples appear as lines (hyperplanes), in accordance with an embodiment of the present application. The data samples are indicated as hyperplanes, e.g., lines in a two-dimensional (2D) depiction of the version space, and can include hyperplanes 252, 254, 256, 258, 260, and 262. The version space V is depicted as bounded by these hyperplanes 252-262, while the classifiers $w_1$, $w_2$, and $w_3$ are indicated as points within the version space V. The ensemble (or collection) of classifiers $w_1$, $w_2$, and $w_3$ can be analyzed for both diversity and robustness.

The diversity of the ensemble is related to the distribution of the points within the version space, while the robustness of the ensemble is related to the location of those points relative to the boundaries of the version space. In some instances, adversarial training may not make a classifier robust to more powerful evasion attacks. For example, in diagram 250, an adversarial example is indicated with a dashed line 272, as a hyperplane. Training on this adversarial example can result in shrinking the version space, which can make the model more accurate, but can also result in making the model more susceptible to adversarial perturbations.

Consider a training set T of d-dimensional data with M possible labels. Further consider a hypothesis $H_i$ (•)=1, 2, . . . M parameterized by scalars $h_{i1}$, $h_{i2}$, . . . , $h_{it}$. $H_i(•)$ is a (possibly non-linear) function. When rendered in d-dimensional space of training points, $H_i(•)$ can appear as a decision boundary that separates samples of the class i. $H_i(•)$ can be termed a "consistent hypothesis" if, for every training sample x: H(x)=TRUE if x has label i, and H(x)=FALSE if x does not have label i.

Extending the intuition described above in relation to FIG. 2B, there can be a t-dimensional space in which all consistent hypotheses $H_i(•)$ appear as points inside a region whose boundaries represent the training samples x∈T. This region can be referred to as the "generalized version space." Exemplary version spaces for the case d=2, and M=6 can be plotted as described below in relation to FIG. 3. Thus, diverse M-class classifiers can be points in the generalized version space, e.g., of FIG. 3. Furthermore, adversarial examples can be perturbations of the boundaries of the version space.

Figure 3:
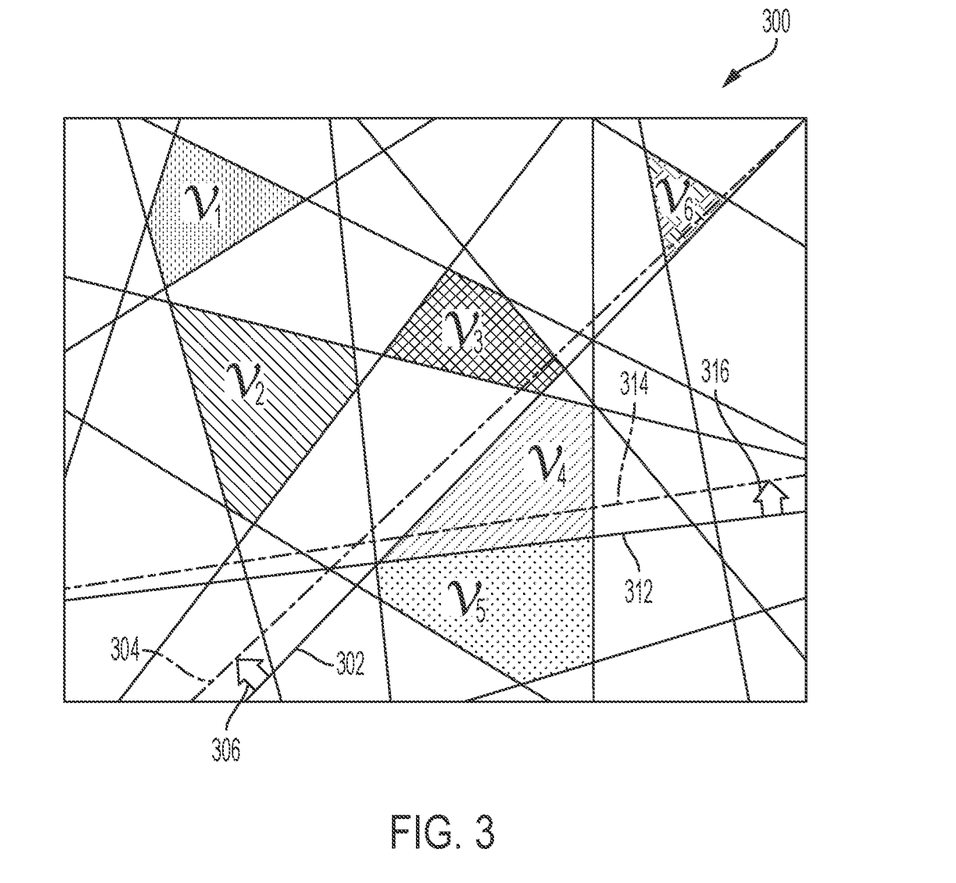
FIG. 3 illustrates a diagram of version spaces for an exemplary one-versus-all six-class problem, in accordance with an embodiment of the present application.

FIG. 3 illustrates a diagram 300 of version spaces for an exemplary one-versus-all six-class problem, in accordance with an embodiment of the present application. The representation of the version space on a two-dimensional page is for illustrative purposes only. In actuality, the version space resides on the surface of a multi-dimensional sphere, thus each of the six colored version spaces are curved surfaces bounded by hyperplanes representing the training data samples. The direction in which the boundaries move under perturbation can depend upon the $l_p$-norm perturbation metric, with p∈{0, 1, 2, ∞}. The extent to which the boundaries (e.g., dashed lines 304 and 314) move into a version space can depend upon the adversary's perturbation budget ∈, as described below in relation to FIG. 5. In general, the most effective strategy for an adversary is to perturb one of the version space boundaries. For example, in diagram 250, the adversarial example depicted by dashed line 272 is a perturbation 280 of one of the version space boundaries, which is depicted by hyperplane 252. As another example, in diagram 300, the adversarial example depicted by dashed line 304 is a perturbation 306 of a version space boundary depicted by hyperplane 302 (for version space $V_3$), and the adversarial example depicted by dashed line 314 is a perturbation 316 of a version space boundary depicted by hyperplane 312 (for version space $V_4$).

Any other adversarial boundary which originates outside the version space will be strictly less effective in fooling the ensemble. For example, in diagram 250, the hyperplanes (training data) depicted as dashed lines 274 and 276 can correspond to adversarial examples which are less effective in fooling the ensemble of classifiers. These are two adversarial examples which do not necessarily shrink the version space, and they are not necessarily clear perturbations of a version space boundary (such as 254, 256, 258, or 260). While the adversarial example depicted by hyperplane 274 may appear to be a perturbation of the version space boundary depicted by hyperplane 252, the perturbation is too big to be considered a perturbation, which can be defined based on a predetermined threshold or geometric distance between hyperplanes, and can be further based on the location of the adversarial example's hyperplane within the current version space. Thus, depending on their location with a diverse ensemble, not all classifiers may be fooled by the adversarial example.

Note that real-world data sets may not be separable (e.g., the agnostic case), and thus it may not always be possible to find a consistent hypothesis which lives in the version space. For example, consider a multi-class training set which is separable except for a single sample x which has a label y. A base classifier H(•) can predict H(x)=z≠y. Using this base classifier, the system can derive an ensemble of classifiers $H_i(•)$ such that $H_i(x)=z$ for all i, which means that all classifiers misclassify x in the same way. This can result in all classifiers being consistent and living in the generalized version space.

Creating Diverse Ensembles and Reasoning about Behavior and Effectiveness Under Attack In the described embodiments, the system can begin with a base classifier in version space, and spawn or generate new classifiers of the same type. The system can also generate multiple base classifiers, where each base classifier has its own version space. One strategic location for the base classifier may be the center of mass of the version space, which can be an optimal classifier for a training set. If the version space is regularly shaped (i.e., not overly skewed in some dimensions), the system can use a Support Vector Machine (SVM) to approximate the location of this optimal classifier.

Figure 4:
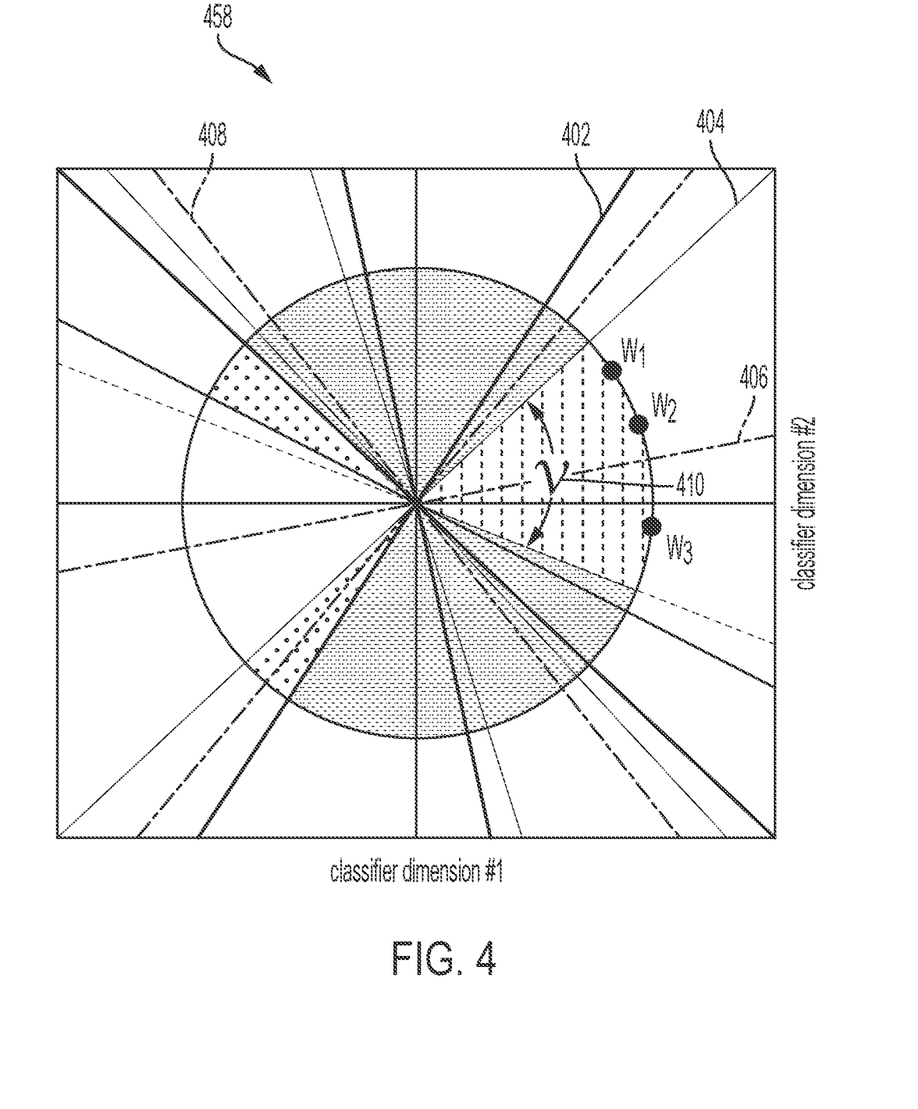
FIG. 4 illustrates a diagram of an exemplary version space, in accordance with an embodiment of the present application.

FIG. 4 illustrates a diagram 400 of an exemplary version space, in accordance with an embodiment of the present application. In diagram 400, classifiers appear as points while data samples appear as hyperplanes (lines in two-dimension (2D)) in a version space V 410. The version space V 410 is indicated as the set of points on the unit circle satisfying $y_i h(x_i) = y_i(w^T x_i) > 0$, which is the intersection of half-circles determined by lines representing the training data samples. The solid lines (e.g., a solid line 402 and a solid-dashed line 404) can represent hyperplanes corresponding to labeled samples, while the dashed lines (e.g., dashed lines 406 and 408) can represent hyperplanes corresponding to unlabeled samples. Similar to FIG. 2A, the solid-dashed lines (e.g., 404) correspond to labeled samples of "Class 2" and the solid lines (e.g., 402) correspond to labeled samples of "Class 1." Furthermore, in diagram 400, three classifiers (previously indicated in diagram 200 as lines which intersect the input space) are indicated as points within version space V 410: $w_1$, $w_2$, and $w_3$.

In some embodiments, in the case of SVMs, the system can spawn classifiers by assigning locations in a circle around a base classifier. By construction, such spawned classifiers would be guaranteed to be consistent with the training data, unlike other approaches which generate ensembles from a base classifier without restricting them to a version space.

The system can spawn classifiers for multi-class models, such as neural networks. Based on the conceptualization of the multi-class version space described above in relation to FIG. 3, the system can create diverse ensembles from neural networks. Assume the creation of an M-concept learner using a general M-class N-stage convolutional neural network (CNN). The type of classification performed by a CNN can depend upon the choice of the loss function (e.g., soft-max, hinge-loss, SVM). In general, given a sufficient number of iterations, the soft-max classifier layer can converge to a hinge-loss classifier (i.e., a maximum margin classifier), which is an SVM classifier. Furthermore, replacing the softmax layer of a CNN by an SVM layer does not adversely impact the performance of the system.

Exemplary CNN Conversion to M-SVM Classifier (as a Linear Model)

Given M outputs in the hinge-loss classifier layer (i.e., an M-SVM), the system can result in an M-concept learner, as described below in relation to FIG. 5.

Figure 5:
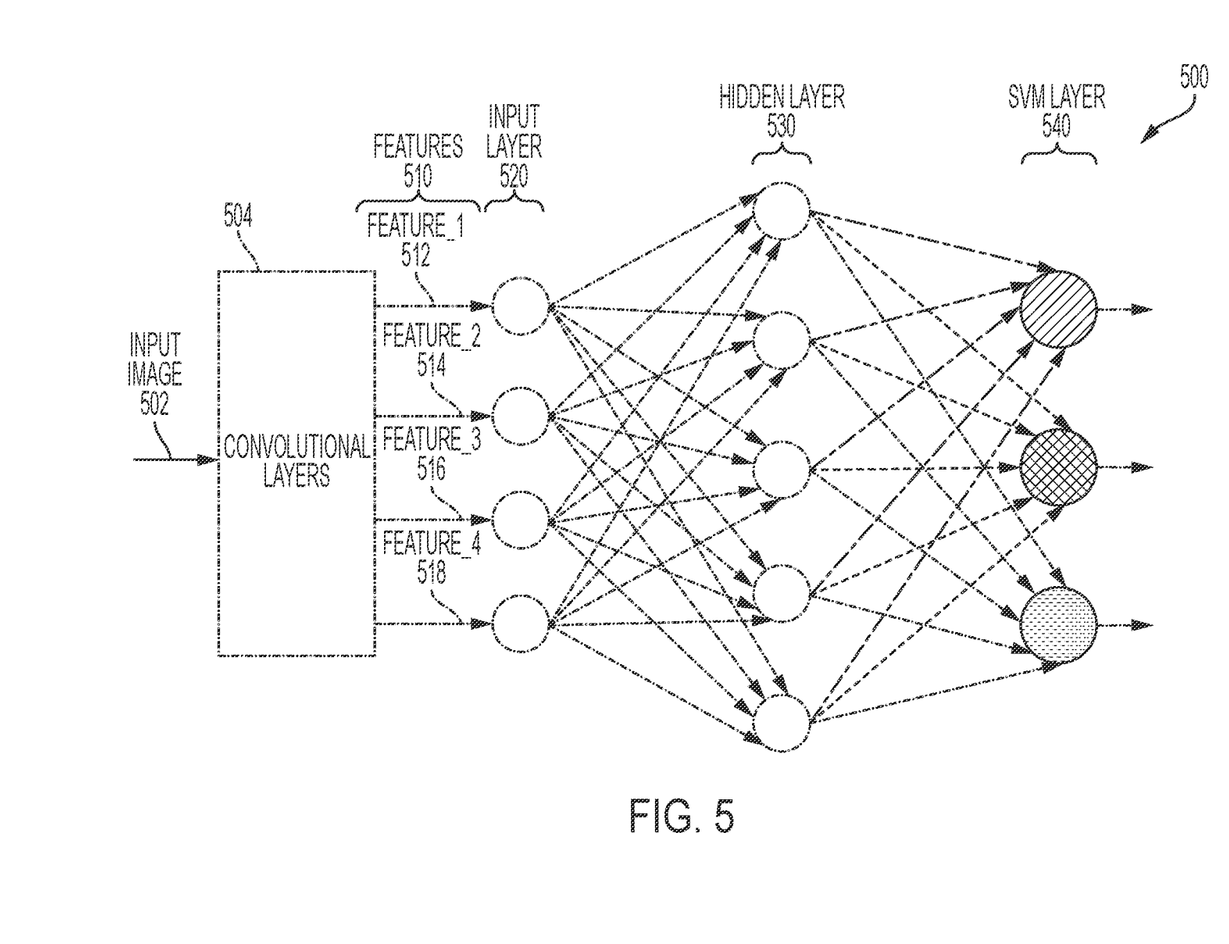
FIG. 5 illustrates a three-class convolutional neural network (CNN) with an output softmax layer replaced by an SVM layer, in accordance with an embodiment of the present application.

FIG. 5 illustrates a three-class convolutional neural network (CNN) 500 with an output softmax layer replaced by an SVM layer, in accordance with an embodiment of the present application. CNN 500 can include: an input image 502; a plurality of convolutional layers 504; an input layer 520; one or more hidden layers 530; and an SVM layer 540 (e.g., a hinge-los classifier rather than a softmax classifier). During operation of CNN 500, the system can take input image 502 and process it through CNN convolutional layers 504. For example, each relevant feature (e.g., each of features 510, including a feature_1 512, a feature_2 514, a feature_3 516, and a feature_4 518) can be provided as input to input layer 520, which can be passed along through CNN 500 to one or more hidden layers 530. This can result in an intermediate representation of the data, finally resulting in SVM classifier layer 540. Thus, given M=3, CNN 500 illustrates a three-concept learner, where the output softmax layer is replaced by a hinge-loss layer (i.e., SVM layer 540).

In some embodiments, the system can create an M-concept learner by training M SVM classifiers at the last stage of the CNN using data from other classes which form the negative cases. In such a context, the hyperplanes of FIG. 3 do not represent the original input features (i.e., features 510, the output of convolutional layers 504 in FIG. 5). Instead, the hyperplanes can represent an intermediate representation which is derived from those input features 510. The weights of the Mth SVM classifier can thus be represented by a point in the Mth version space in FIG. 3. Constructing diverse ensembles inside each of the separate version spaces of FIG. 3 can be likened to altering the corresponding SVM weights while maximizing diversity.

Quantifying the Relationship Between Diversity and Robustness Metrics

Diversity metrics can measure the distribution or dispersion of classifiers in the version space, while robustness metrics can depend on the decision rule of the ensemble. In the described embodiments, the larger the dispersion of the classifiers in the version space, the higher the robustness of the ensemble of classifiers. The classifiers can be represented by points in the version space, while data points, including adversarial examples, can be represented by lines or hyperplanes in the version space. Adversarial examples can further indicate boundaries which slide across the version space. If the classifiers are in a tight cluster (e.g., the circles in FIG. 4), this can indicate a less diverse and a less robust ensemble, because adversarial examples which are designed for one classifier will easily transfer to another classifier. In contrast, if the classifiers are carefully arranged further apart from each other in the version space (e.g., the triangles in FIG. 4), this can indicate a more diverse and a more robust ensemble, because the system can mitigate the transferability of adversarial examples.

The system can provide provable guarantees about robustness against adversarial perturbation when given the constellation of classifiers in an ensemble and the adversary's perturbation budget $\in$ (bounded in $l_p$-norm for $p \in \{0, 1, 2, \infty\}$. The adversary's perturbation budget $\in$ can determine the extent to which the adversarial boundary moves into the version space. If the boundary crosses M out of the N points, representing classifiers, then those M classifiers will misclassify the adversarial example. The ensemble will misclassify the adversarial example only if M is large enough, for e.g., if M>N/2.

The system can follow a geometric approach to arrange classifiers in version space, including several classes of dispersion metrics to identify appropriate metrics to quantify the diversity of an ensemble of classifiers. The diversity metric can quantify the degree of statistical dispersion (scatter, spread) of the classifiers in multidimensional version spaces. The candidate metrics are symmetric, invariant to rotation and translation, and are linear in scale. For example, if all the classifier parameters are multiplied by a, the dispersion metric will change by a multiplicative factor g(a) where g(•) maps real numbers to the non-negative real line. Some examples of the dispersion metrics that may satisfy these properties include, e.g., the Mahalanobis distance and diameter of the data.

The system can also determine robustness metrics derived from the ensemble decision rule, e.g., a majority rule, a rule based on average probabilities, a rule based on a ratio or percentage whether predetermined or not, or another consensus decision rule. The system can measure robustness trends for ensembles which are constructed based on a variety of diversity metrics (as described above). For example, the system can determine or analyze the percentage of classifiers which are successfully attacked. Another related metric can be the accuracy of the ensemble decision rule in the presence of adversarial examples.

Yet another robustness measure can be based on the influence of training samples on the classifiers in the ensemble. This robustness metric can be a counterfactual explanation about where the classifier would be located in version space if a specific training sample (or equivalently, a specific version space boundary) was removed. The system can also use other metrics in order to formulate a global metric for ensemble robustness.

The system can also determine and analyze the effects in version space of powerful and widely used attacks, including, e.g., Fast Gradient Sign (FGS) method, Carlini-Wagner attack, single-pixel attack, and DeepFool. The system can quantify the effects of these attacks based on: how the adversarial boundaries intersect the version space; and the number of classifiers (points) that are crossed by an adversarial boundary, and thus misclassify the corresponding adversarial example.

These effects can be visualized and are described below in relation FIGS. 6A, 6B, and 6C. FIGS. 6A, 6B, and 6C illustrate diagrams of exemplary reasoning about robustness as a function of ensemble diversity for various perturbations metrics and published attacks, in accordance with an embodiment of the present application. FIG. 6A illustrates a diagram 600 including a graph with an x-axis of $l_p$ perturbation 602 and a y-axis of a percentage (%) of classifiers fooled 604. Given an adversary's budget $\in$ 606, diagram 600 depicts an exemplary visualization of the effect of an adversarial example in a version space. That is, in a version space 610, which is bounded by (data points) hyperplanes 612, 614, 616, and 618, an adversarial example is indicated by a dashed line 620 in version space 616, while the classifiers are indicated as five circles in version space 616. Given the tight clustering of the five classifiers (circles) in version space 616, it can be observed that adversarial example 620 can fool a very high percentage (e.g., all) of the classifiers (shown by a line 608 in the graph). The system can reason that these tightly clustered classifiers are indicative of low diversity and low robustness.

Figure 6B:
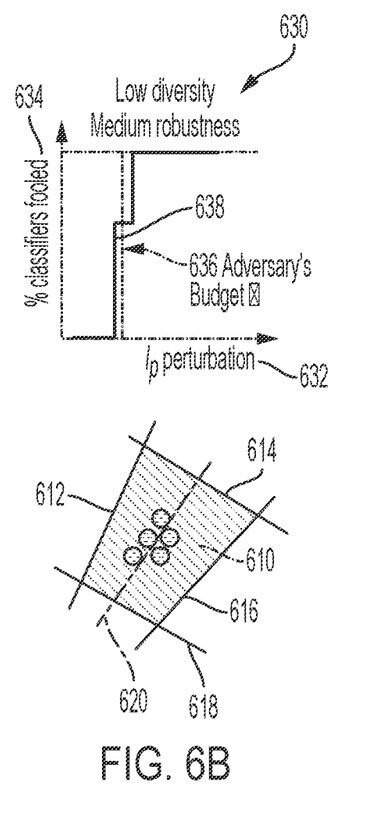
FIG. 6B illustrates a diagram of exemplary reasoning about robustness as a function of ensemble diversity for various perturbations metrics and published attacks, in accordance with an embodiment of the present application.

FIG. 6B illustrates a diagram 630 including a graph with an x-axis of $l_p$ perturbation 632 and a y-axis of a percentage (%) of classifiers fooled 634. Given an adversary's budget $\in$ 636, diagram 630 depicts an exemplary visualization of the effect of an adversarial example in version space 610, where the version space includes five classifiers arranged or located in positions which are different from the positions of the five tightly-clustered classifiers of diagram 600. Given the tightly clustered yet more distributed arrangement of the five classifiers (circles) in version space 610 of diagram 630, it can be observed that adversarial example 640 can fool a lesser percentage (e.g., around 60%) of the classifiers (shown by a line 638 in the graph). The system can reason that these tightly clustered yet somewhat distributed classifiers are indicative of low diversity and medium robustness.

Figure 6C:
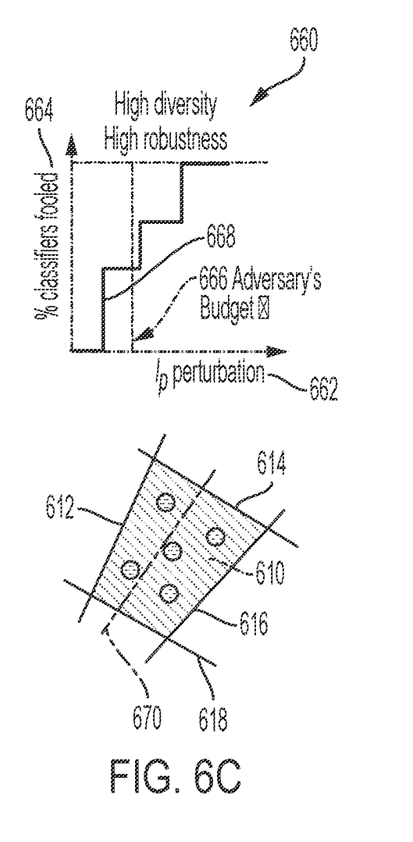
FIG. 6C illustrates a diagram of exemplary reasoning about robustness as a function of ensemble diversity for various perturbations metrics and published attacks, in accordance with an embodiment of the present application.

FIG. 6C illustrates a diagram 660 including a graph with an x-axis of $l_p$ perturbation 662 and a y-axis of a percentage (%) of classifiers fooled 664. Given an adversary's budget $\in$ 666, diagram 660 depicts an exemplary visualization of the effect of an adversarial example in version space 610, where the version space includes five classifiers arranged or located in positions which are different from the positions of both the five tightly-clustered classifiers of diagram 600 and the tightly cluster yet somewhat distributed classifiers of diagram 630. Given the less tightly clustered and more distributed arrangement of the five classifiers (circles) in version space 610 of diagram 660, it can be observed that adversarial example 670 can fool an even lesser percentage (e.g., around 40%) of the classifiers (shown by a line 668 in the graph), in comparison to lines 608 and 638 of diagrams 600 and 630, respectively. Thus, the system can reason that these less tightly clustered and more distributed classifiers are indicative of high diversity and high robustness.

Note that in diagrams 630 and 660, the percentage of classifiers fooled increases to 100% when the adversary's budget is exceeded, whether almost immediately as in line 638 of diagram 630, or after another "step" or level as in line 668 of diagram 660.

Based on the exemplary reasoning described above in relation to FIGS. 6A-6C, the system can derive estimates or bounds on the ensemble disagreement for each class of attack, and can establish the relationship of those bounds to the ensemble diversity metric. Furthermore, the system can perform this reasoning to establish performance points or design points indicating how classifiers in the ensemble need to be selected, in order to maximize the robustness.

The system can further analyze the diversity and robustness of ensembles generated by state-of-the-art approaches, such as: learning classifiers from disjoint subsets of training data; learning a classifier from all training data and then creating new classifiers by adding noise to its parameters; learning specialist classifiers from particular target classes and a single generalist classifier; hyperparameter tuning; loss function optimization; and prediction diversity.

For CNNs which typically use a softmax classifier layer, the system can instead use a hinge-loss classifier in the classification layer, as explained above in relation to FIG. 5. To obtain further diversity, the system can use multiple base-CNNs, and spawn diverse ensembles for each base CNN in its respective generalized version space, as described above in relation to FIG. 3.

Integration into a Practical Application and Improvements to Technologies

The embodiments described herein can be integrated into a practical application for, and can result in an improvement in, several technologies and technical fields, including but not limited to: artificial intelligence; machine learning and analytics; convolutional neural networks; data mining (including of a significant volume of data); data classification; and defense against adversarial attacks and adversarial examples, including perturbation-bounded evasion attacks.

Users of the system described herein can include an individual with a smartphone, a mobile device, or a computing terminal. Users of the system can also include any client in a machine learning or an artificial intelligence setting, e.g., where reasoning about the diversity and robustness of an ensemble of classifiers can result in improving the effectiveness of the classifiers against adversarial attacks. Thus, the embodiments described herein can result in more efficiently training the machine learning model, which can also result in an improved model and a more efficient overall user experience.

Exemplary Methods for Facilitating Reasoning about an Ensemble of Classifiers

Figure 7A:
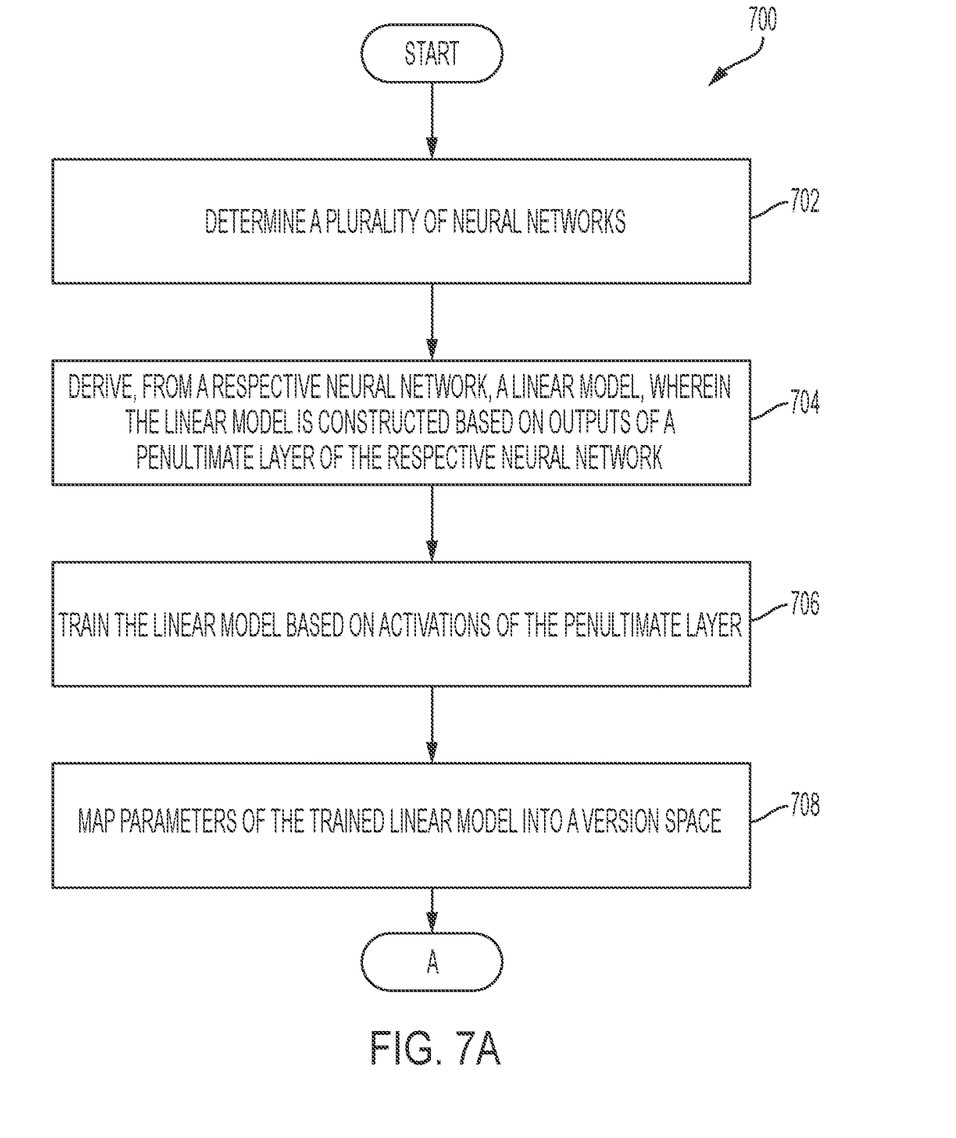
FIG. 7A presents a flowchart illustrating a method for facilitating reasoning about classifiers, in accordance with an embodiment of the present application.

FIG. 7A presents a flowchart 700 illustrating a method for facilitating reasoning about classifiers, in accordance with an embodiment of the present application. During operation, the system determines a plurality of neural networks (operation 702). The system derives, from a respective neural network, a linear model, wherein the linear model is constructed based on outputs of a penultimate layer of the respective neural network (operation 704). The system trains the linear model based on activations of the penultimate layer (operation 706). The system maps parameters of the trained linear model into a version space (operation 708), and the operation continues at Label A of FIG. 7B.

Figure 7B:
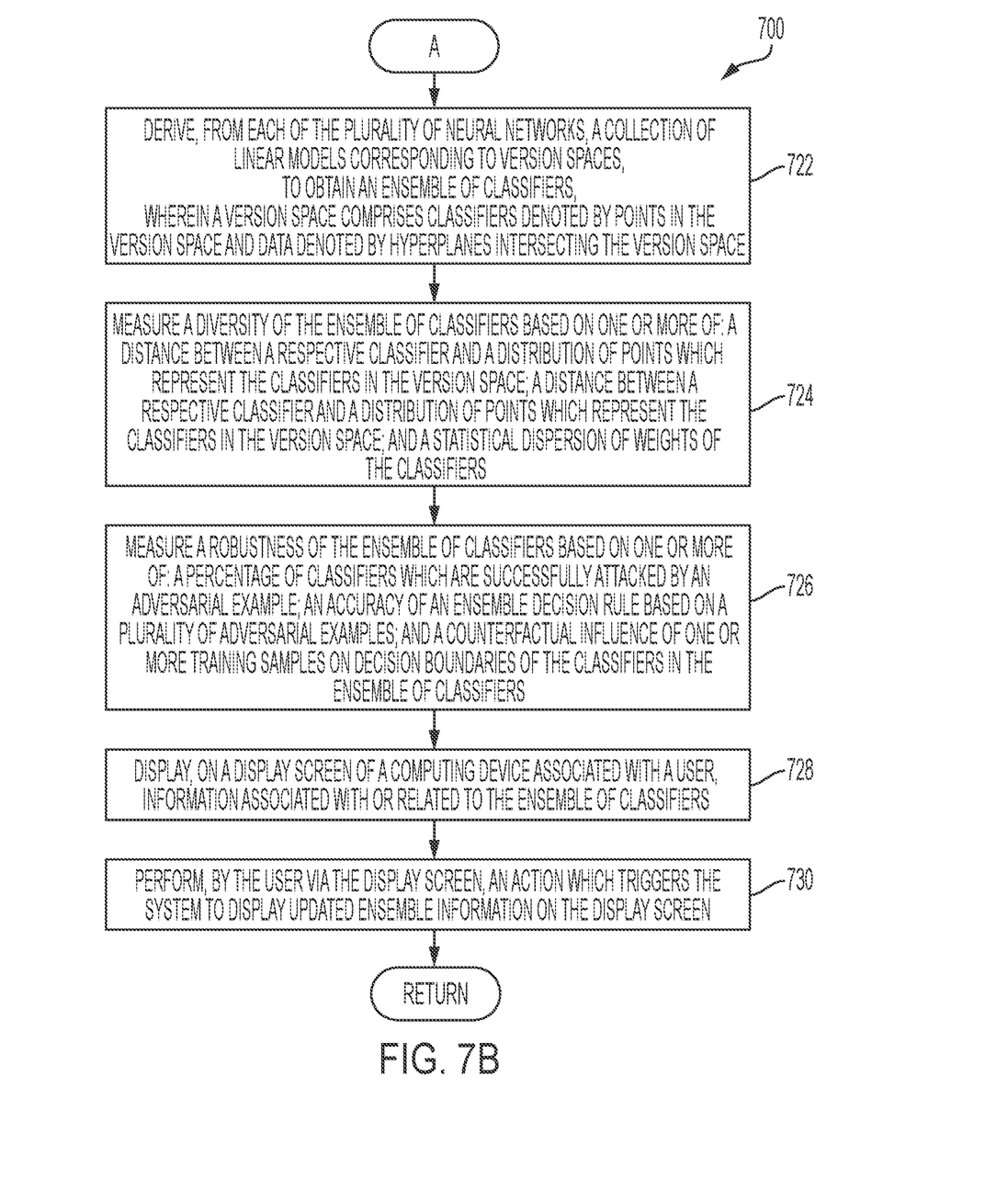
FIG. 7B presents a flowchart illustrating a method for facilitating reasoning about classifiers, in accordance with an embodiment of the present application.

FIG. 7B presents a flowchart 720 illustrating a method for facilitating reasoning about classifiers, in accordance with an embodiment of the present application. During operation, the system derives, from each of the plurality of neural networks, a collection of linear models corresponding to version spaces, to obtain an ensemble of classifiers, wherein a version space comprises classifiers denoted by points in the version space and data denoted by hyperplanes intersecting the version space (operation 722). The system measures a diversity of the ensemble of classifiers based on one or more of: a geometric distance between a respective classifier and each other classifier in a respective version space; a distance between a respective classifier and a distribution of points which represent the classifiers in the version space; and a statistical dispersion of weights of the classifiers (operation 724). One example of a statistically motivated distance measure is a Mahalanobis distance. The system measures a robustness of the ensemble of classifiers based on one or more of: a percentage of classifiers which are successfully attacked by an adversarial example; an accuracy of an ensemble decision rule based on a plurality of adversarial examples; and a counterfactual influence of one or more training samples on decision boundaries of the classifiers in the ensemble of classifiers (operation 726).

The system displays, on a display screen of a computing device associated with a user, information associated with or related to the ensemble of classifiers (operation 728). The system also performs, by the user via the display screen, an action which triggers the system to display updated ensemble information on the display screen (operation 730). Exemplary user actions and information displayed on display screen are described above in relation to FIG. 1.

Exemplary Computer and Communication System

Figure 8:
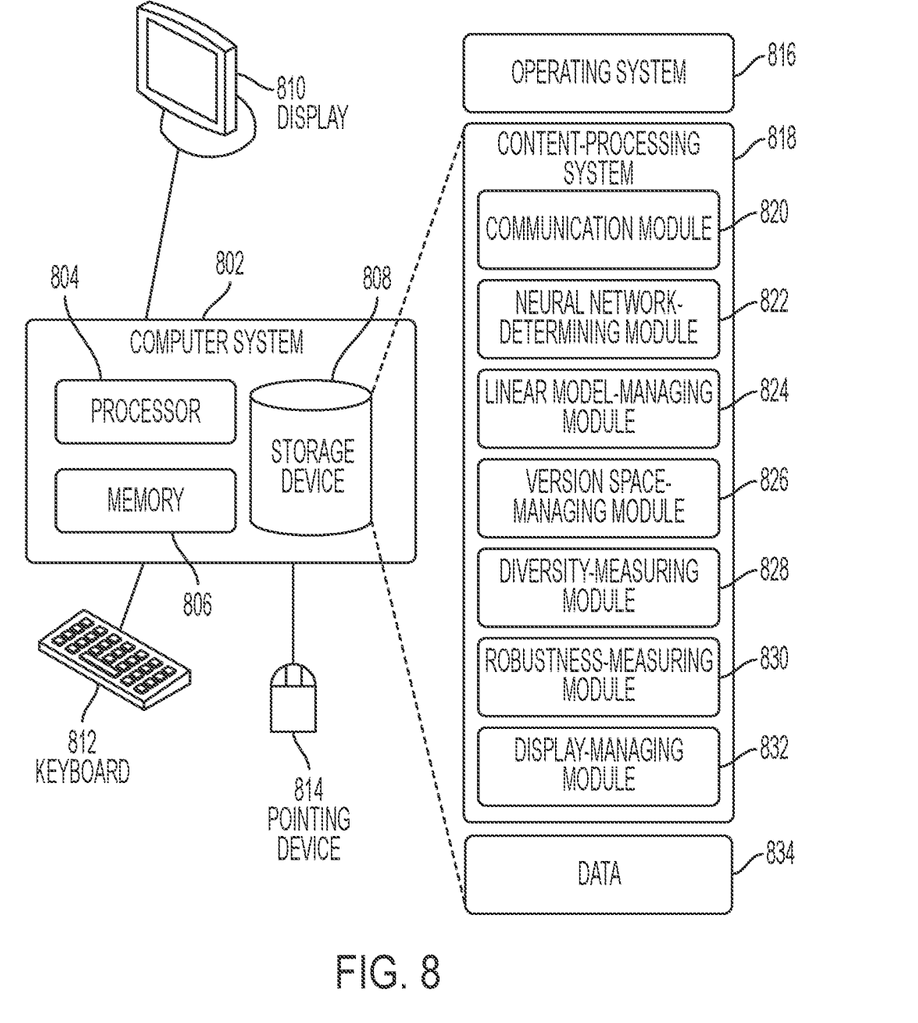
FIG. 8 presents an exemplary computer and communication system which facilitates data classification, in accordance with an embodiment of the present application.

FIG. 8 presents an exemplary computer and communication system 802 which facilitates data classification, in accordance with an embodiment of the present application. Computer system 802 includes a processor 804, a memory 806, and a storage device 808. Memory 806 can include a volatile memory (e.g., RAM) that serves as a managed memory, and can be used to store one or more memory pools. Furthermore, computer system 802 can be coupled to a display device 810, a keyboard 812, and a pointing device 814. Storage device 808 can store an operating system 816, a content-processing system 818, and data 834.

Content-processing system 818 can include instructions, which when executed by computer system 802, can cause computer system 802 to perform methods and/or processes described in this disclosure. Specifically, content-processing system 818 may include instructions for sending and/or receiving data packets to/from other network nodes across a computer network (communication module 820). A data packet can include data, a request, a command, a model, a classifier, training data, and test data.

Content-processing system 818 can further include instructions for determining a plurality of neural networks (neural network-determining module 822). Content-processing system 818 can include instructions for deriving, from a respective neural network, a linear model, wherein the linear model is constructed based on an output of a penultimate layer of the respective neural network (linear model-managing module 824). Content-processing system 818 can include instructions for training the linear model based on activations of the penultimate layer (linear model-managing module 824). Content-processing system 818 can include instructions for mapping parameters of the trained linear model into a version space (version space-managing module 826).

Content-processing system 818 can additionally include instructions for deriving, from each of the plurality of neural networks, a collection of linear models each belonging to a version space, to obtain an ensemble of classifiers, wherein a version space comprises classifiers denoted by points in the version space and data which is represented by hyperplanes bounding the version space (linear model-managing module 824 and version space-managing module 826). Content-processing system 818 can include instructions for measuring a diversity of the ensemble of classifiers (diversity-measuring module 828) and for measuring a robustness of the ensemble of classifiers (robustness-measuring module 830). Content-processing system 818 can include instructions for displaying ensemble information on a display screen of a computing device associated with a user (display-managing module 832).

Data 834 can include any data that is required as input or that is generated as output by the methods and/or processes described in this disclosure. Specifically, data 832 can store at least: data; a set of data; processed data; an input space; a classifier; a set of classifiers; an ensemble of classifiers; an intermediate representation of data; activations of a layer of a CNN; an output from a layer of a CNN; a version space; a point in a version space; a hyperplane or a boundary in a version space; an adversarial example; an adversarial boundary; a neural network; a parameter; a convolutional neural network (CNN); a linear model; an indicator of a penultimate or a final layer of a CNN; training data; test data; a size; a classification layer; a hinge-loss classifier; a softmax classifier; an SVM classifier; a number of dimensions; a number of classes; a percentage of classifiers successfully attacked by an adversarial example; an ensemble decision rule; a measure or quantification of an accuracy or an influence; a rate of accuracy; a perturbation-bounded evasion attack; and a result of and information associated with converting a neural network to a linear model.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, the methods and processes described above can be included in hardware modules or apparatus. The hardware modules or apparatus can include, but are not limited to, application-specific integrated circuit (ASIC) chips, field-programmable gate arrays (FPGAs), dedicated or shared processors that execute a particular software module or a piece of code at a particular time, and other programmable-logic devices now known or later developed. When the hardware modules or apparatus are activated, they perform the methods and processes included within them.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A computer-executable method for facilitating reasoning about classifiers, the method comprising:
   determining a plurality of neural networks in a machine learning environment;
   receiving, by a respective neural network, an original input image;
   processing, by convolutional layers of the respective neural network, the original input image;
   obtaining, based on the processing by the convolutional layers, features associated with the original input image;
   passing the features to an input layer and a hidden layer of the respective neural network, wherein the hidden layer comprises a penultimate layer of the respective neural network;
   obtaining, based on the features passed to the penultimate layer, an output of the penultimate layer comprising activations which indicate an intermediate representation of the original input image to the respective neural network;
   deriving, from the respective neural network, a linear model based on the activations of the penultimate layer of the respective neural network, wherein the activations are associated with fewer parameters than the original input data;
   training the linear model based on the activations of the penultimate layer;
   mapping parameters of the trained linear model into a version space in the machine learning environment;
   obtaining an ensemble of classifiers by deriving, from each of the plurality of neural networks, a collection of linear models each belonging to a version space in the machine learning environment;
   measuring a robustness of the ensemble of classifiers based on removing a version space boundary from a respective version space;
   displaying, on a display screen of a computing device associated with a user, information associated with the ensemble of classifiers;
   in response to determining a command performed by the user, updating the ensemble of classifiers, including measuring the robustness of the updated ensemble of classifiers; and
   in response to updating the ensemble of classifiers, displaying, on the display screen, updated information associated with the updated ensemble of classifiers.

2. The method of claim 1,
   wherein each of the plurality of neural networks are trained using a same training data set,
   wherein the penultimate layer in each of the plurality of neural networks is a same size, and
   wherein a final layer in each of the plurality of neural networks is a same size.

3. The method of claim 1
   wherein a version space comprises classifiers denoted by points in the version space and data which is represented by hyperplanes bounding the version space.

4. The method of claim 3,
   wherein the ensemble of classifiers comprises collections of linear models derived from the plurality of neural networks, and
   wherein a collection of linear models are classifiers which are represented by points across a plurality of version spaces.

5. The method of claim 3, further comprising measuring a diversity of the ensemble of classifiers based on one or more of:
   a geometric distance between a respective classifier and any other classifier in a respective version space; and
   a geometric distribution of points which represent the classifiers in the respective version space.

6. The method of claim 5,
   wherein the classifiers are represented by weights, and
   wherein measuring the diversity of the ensemble of classifiers is based on a statistical dispersion of the weights of the classifiers.

7. The method of claim 1,
   wherein the activations of the penultimate layer comprise an intermediate representation of data which is distinct from the data input to the respective neural network.

8. The method of claim 1, further comprising:
   measuring a robustness of the ensemble of classifiers based on one or more of:
     a percentage of classifiers which are successfully attacked by an adversarial example;
     an accuracy of an ensemble decision rule based on a plurality of adversarial examples; and
     an influence of one or more training samples on the classifiers in the ensemble of classifiers.

9. The method of claim 1, further comprising:
   increasing, using the ensemble, an accuracy in classification of a set of test data modified according to perturbation-bounded evasion attacks or other adversarial techniques.

10. The method of claim 1, wherein deriving the linear model from the respective neural network comprises:
    converting the respective neural network to the linear model based on a one or more of:
      a support vector machine (SVM);
      a softmax classifier; and
      a hinge-loss classifier.

11. A computer system for facilitating data classification, the computer system comprising:
    a processor; and
    a storage device storing instructions that when executed by the processor cause the processor to perform a method, the method comprising:
      determining a plurality of neural networks in a machine learning environment;
      receiving, by a respective neural network, an original input image;
      processing, by convolutional layers of the respective neural network, the original input image;
      obtaining, based on the processing by the convolutional layers, features associated with the original input image;
      passing the features to an input layer and a hidden layer of the respective neural network, wherein the hidden layer comprises a penultimate layer of the respective neural network;
      obtaining, based on the features passed to the penultimate layer, an output of the penultimate layer comprising activations which indicate an intermediate representation of the original input image to the respective neural network;
      deriving, from a the respective neural network, a linear model based on the output of the penultimate layer of the respective neural network, wherein the activations are associated with fewer parameters than the original input data;

training the linear model based on the activations of the penultimate layer;

mapping parameters of the trained linear model into a version space in the machine learning environment;

obtaining an ensemble of classifiers by deriving, from each of the plurality of neural networks, a collection of linear models each belonging to a version space in the machine learning environment;

measuring a robustness of the ensemble of classifiers based on removing a version space boundary from a respective version space;

displaying, on a display screen of a computing device associated with a user, information associated with the ensemble of classifiers;

in response to determining a command performed by the user, updating the ensemble of classifiers, including measuring the robustness of the updated ensemble of classifiers; and in response to updating the ensemble of classifiers, displaying, on the display screen, updated information associated with the updated ensemble of classifiers.

12. The computer system of claim 11, wherein each of the plurality of neural networks are trained using a same training data set, wherein the penultimate layer in each of the plurality of neural networks is a same size, and wherein a final layer in each of the plurality of neural networks is a same size.

13. The computer system of claim 11, wherein a version space comprises classifiers denoted by points in the version space and data which is represented by hyperplanes bounding the version space; and wherein the method further comprises measuring a diversity of the ensemble of classifiers.

14. The computer system of claim 13, wherein the ensemble of classifiers comprises collections of linear models derived from the plurality of neural networks, and wherein a collection of linear models are classifiers which are represented by points across a plurality of version spaces.

15. The computer system of claim 13, wherein the method further comprises measuring the diversity of the ensemble of classifiers based on one or more of:

a geometric distance between a respective classifier and any other classifier in a respective version space; and a geometric distribution of points which represent the classifiers in the respective version space.

16. The computer system of claim 15, wherein the classifiers are represented by weights, and wherein measuring the diversity of the ensemble of classifiers is based on a statistical dispersion of the weights of the classifiers.

17. The computer system of claim 11, wherein the activations of the penultimate layer comprise an intermediate representation of data which is distinct from the data input to the respective neural network.

18. The computer system of claim 11, wherein the method further comprises:

measuring a robustness of the ensemble of classifiers based on one or more of:

a percentage of classifiers which are successfully attacked by an adversarial example;

an accuracy of an ensemble decision rule based on a plurality of adversarial examples; and an influence of one or more training samples on the classifiers in the ensemble of classifiers.

19. The computer system of claim 11, wherein the method further comprises:

increasing, using the ensemble, an accuracy in classification of a set of test data modified according to perturbation-bounded evasion attacks or other adversarial techniques.

20. The computer system of claim 11, wherein deriving the linear model from the respective neural network comprises:

converting the respective neural network to the linear model based on a one or more of:

a support vector machine (SVM);

a softmax classifier; and a hinge-loss classifier.

\* \* \* \* \*